Figure 3:
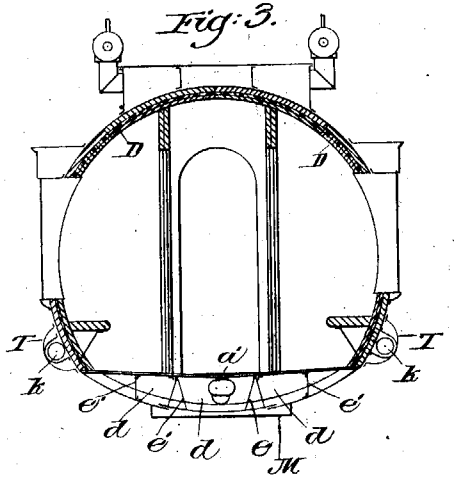

C. M. SMITH.
Assignor, by mesne assignments, to the STEEL CAR COMPANY.
RAILWAY CAR.
No. 10,955. Reissued Aug. 28, 1888.
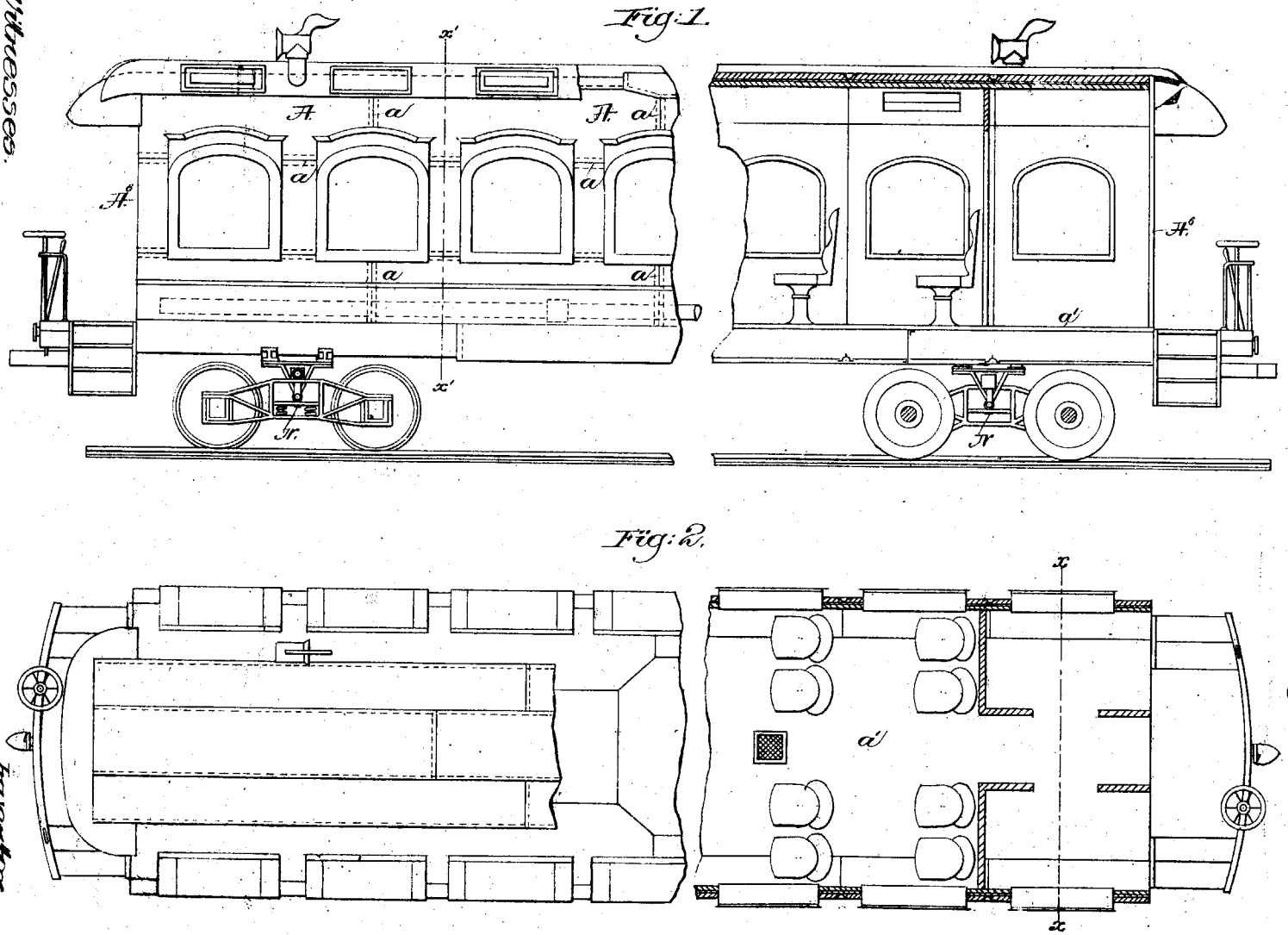
Witnesses.
Fred. S. Crumbaf
Frederick L. Emery
Inventor.
Charles M. Smith
by Crosby & Gregory
Attys
THE ECKERT LITHOGRAPHING CO., WASHINGTON, D. C.

C. M. SMITH.

Assignor, by mesne assignments, to the STEEL CAR COMPANY.

RAILWAY CAR.

No. 10,955. Reissued Aug. 28, 1888.

Witnesses.
Fred. S. Greenleaf
Frederick L. Emery.

Inventor.
Charles M. Smith
by Lemby & Gregory
Attys

THE ECKERT LITHOGRAPHING CO., WASHINGTON, D. C.

C. M. SMITH.
Assignor, by mesne assignments, to the STEEL CAR COMPANY.
RAILWAY CAR.
No. 10,955. Reissued Aug. 28, 1888.
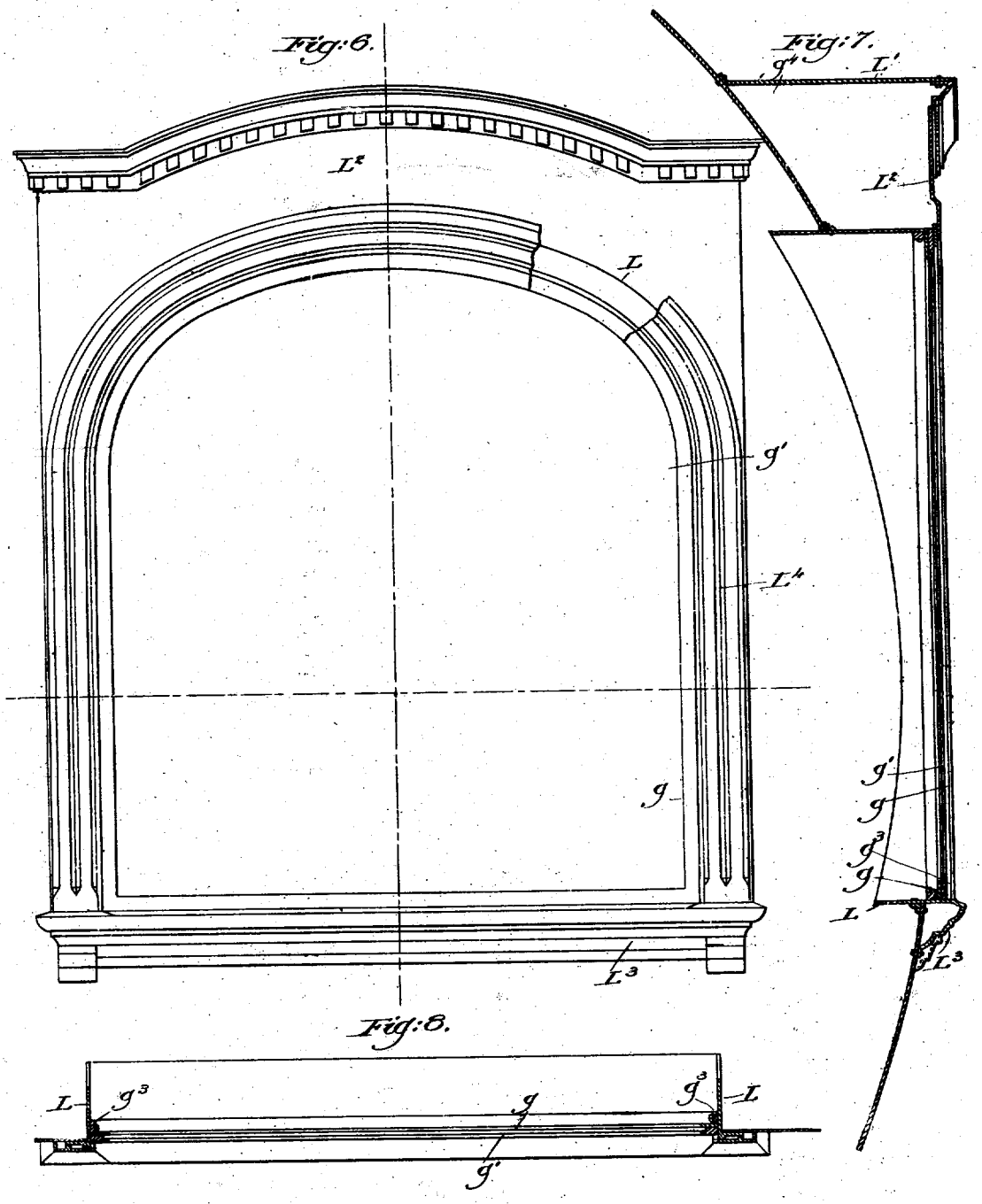
Witnesses.
Fred. S. Crumbaf
Francis L. Emery.
Inventor.
Charles M. Smith,
by Lemby & Gregory
Attys.
THE ECKERT LITHOGRAPHING CO. WASHINGTON, D. C.

C. M. SMITH.

Assignor, by mesne assignments, to the STEEL CAR COMPANY.

RAILWAY CAR.

No. 10,955. Reissued Aug. 28, 1888.

Witnesses.
Fred. S. Crunden
Frederick L. Emery.

Inventor.
Charles M. Smith,
by Lemby & Gregory
Attys.

THE ECKERT LITHOGRAPHING CO., WASHINGTON, D. C.

UNITED STATES PATENT OFFICE.

CHARLES M. SMITH, OF BOSTON, MASSACHUSETTS, ASSIGNOR, BY MESNE ASSIGNMENTS, TO THE STEEL CAR COMPANY, OF DENVER, COLORADO.

RAILWAY-CAR.

SPECIFICATION forming part of Reissued Letters Patent No. 10,955, dated August 28, 1888.

Original No. 366,519, dated July 12, 1887. Application for reissue filed June 25, 1888. Serial No. 279,121.

*To all whom it may concern:*

Be it known that I, CHARLES M. SMITH, a citizen of the United States, residing at Boston, in the county of Suffolk and State of Massachusetts, have invented an Improvement in Railway-Cars, of which the following description, in connection with the accompanying drawings, is a specification, like letters on the drawings representing like parts.

This invention has for its object to increase the safety, strength, and durability, and to decrease the weight and cost of manufacture of railway-cars, both those employed for passengers and for transportation purposes.

The joint application, Serial No. 180,949, filed October 26, 1886, by C. A. Smith and C. M. Smith, shows a railway-car constructed in accordance with my invention, the said car being ventilated in the novel manner set forth in the said application.

In accordance with my present invention my improved car is composed chiefly and preferably entirely of metal, and preferably of low-grade steel—such as used in tank-work—the metal being in sheets riveted together to form a long and somewhat circular body, the latter being strengthened at and below the floor-line with peculiar keelsons and cross-braces, the interior of the body being supported at proper intervals by means of annular ribbed braces, preferably made hollow both for lightness coupled with strength, and for use as ducts or inlets for air to the interior of the car, either above or below the floor, or both, as may be desired, the said ducts communicating with air-passages in the monitor-top mounted upon the car-roof, substantially as shown in the application above referred to.

The car-body is provided with spaces for windows, the frames of which are made of metal and provided with flanges to receive bolts, by which to attach them to and so as to project from the car-body, after the manner of dormer-windows, each window-frame having preferably a metal sash. The car-body is also provided externally with long reservoirs or receptacles for gas, which latter will be filled with gas from proper reservoirs, the gas passing therefrom into the car-body through suitable pipes and fixtures, the said reservoirs, besides holding gas, aiding in strengthening the car-body longitudinally.

The car-body, in order to secure therein ample space within the established standard width and height for car-bodies, is shaped externally so that its circumferential wall falls, as herein shown, in the arc of three different circles, substantially the upper half of the body being disposed in one circle, while the two lower sides and the bottom of the body are disposed in arcs of two other circles, as will be shown in the drawings.

The bolster, which sustains the body on the truck, is made of metal and is curved at its top to fit the convexity of the body, and is flat at its bottom or under side to fit the bearings on the truck.

The particular features in which my invention consist will be pointed out in the claims at the end of this specification.

Figure 4:
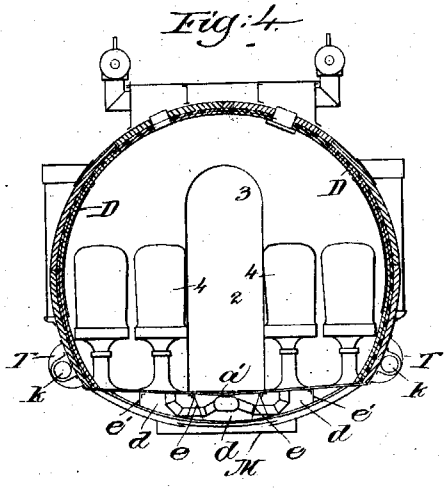
Figure 5:
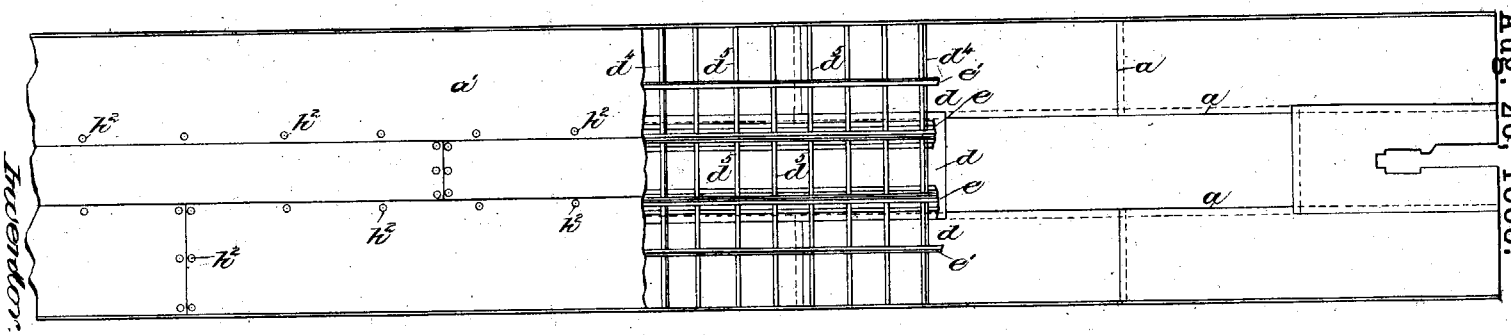

Figure 1 in side elevation, partially broken out, represents a sufficient portion of a railway passenger-car embodying my improvements to enable my invention to be understood. Fig. 2 is a plan view with part of the monitor-roof and of the top of the car-body and of the side walls broken out. Fig. 3 is a section of Fig. 1 on line $x\ x$, looking toward the right; Fig. 4, a section of Fig. 1 on line $x'\ x'$, looking in the same direction. Fig. 5 is a detail showing the top of the floor of the car, the latter being partially broken out to show the keelsons, cross-braces, floor-beams, and spaces between the keelsons, and then at the right the parts last referred to as below the floor are all broken away, except the smoke-pipes, they being above the bottom or under side of the car-body; Fig. 6, on a large scale, represents one of the window-frames; Figs. 7 and 8, vertical and cross sections of the same; and Fig. 9 an enlarged partial cross-section of the car-body, to show the manner of strengthening it on the inside.

The car-body A is composed of numerous sheets or plates of metal riveted together at their edges, as at $a$, the edges preferably being abutted and strapped at the inner sides, the points of junction being immaterial, so long as the joints are broken or not made continuous circumferentially or longitudinally.

As herein shown, the curve of the body from about the middle of its height over its top side is struck from the dot 2. (See Fig. 4.) The bottom of the body, of greater curvature, is struck from the dot 3, and the sides from the bottom upward for part of the height of the car are in a curve struck from the dots 4.

The body is provided at its upper side with a monitor-top composed of metal plates joined to the body and together to form air-passages, substantially as shown and described in the above-mentioned application.

The car-body is strengthened on its inside by ribbed braces D, (see Figs. 3, 4, and 9,) which preferably form ducts or channels for conveying the air from the monitor-top to beneath the car-floor $a'$, as in the application referred to, the said ribbed braces sustaining the interior of the car-body and preventing the same from being broken in or collapsing by pressure or blows from the outer side; but the said ribbed braces, when used for freight and other cars where ventilation is not desired, may be made solid.

The car-floor $a'$ is supported upon keelsons $e$ $e'$, which divide the space between the floor $a'$ and the inner side of the car-body (see Figs. 3 and 4) into air-spaces $d$ $d$.

The keelsons $e$ nearest the longitudinal center of the car-body are made of two plates of steel flanged at their edges, the flanges along one edge of each plate being of such shape as to permit the plates to be connected along one edge and present an A-shaped keelson, the flanged feet of the A-shaped keelsons being riveted to the interior of the bottom of the car-body, while the apex of each of the said keelsons serves as the main support for the floor $a'$.

The keelsons $e'$ are made of single plates flanged at each edge and fixed by rivets or otherwise to both the floor and body, as best shown in Figs. 3, 4, and 5, the said keelsons $e'$ being in practice prolonged beyond the ends of the body, as shown in application Serial No. 213,242 by like letters, to support the entire platform at each end of the car-body.

Figure 9:
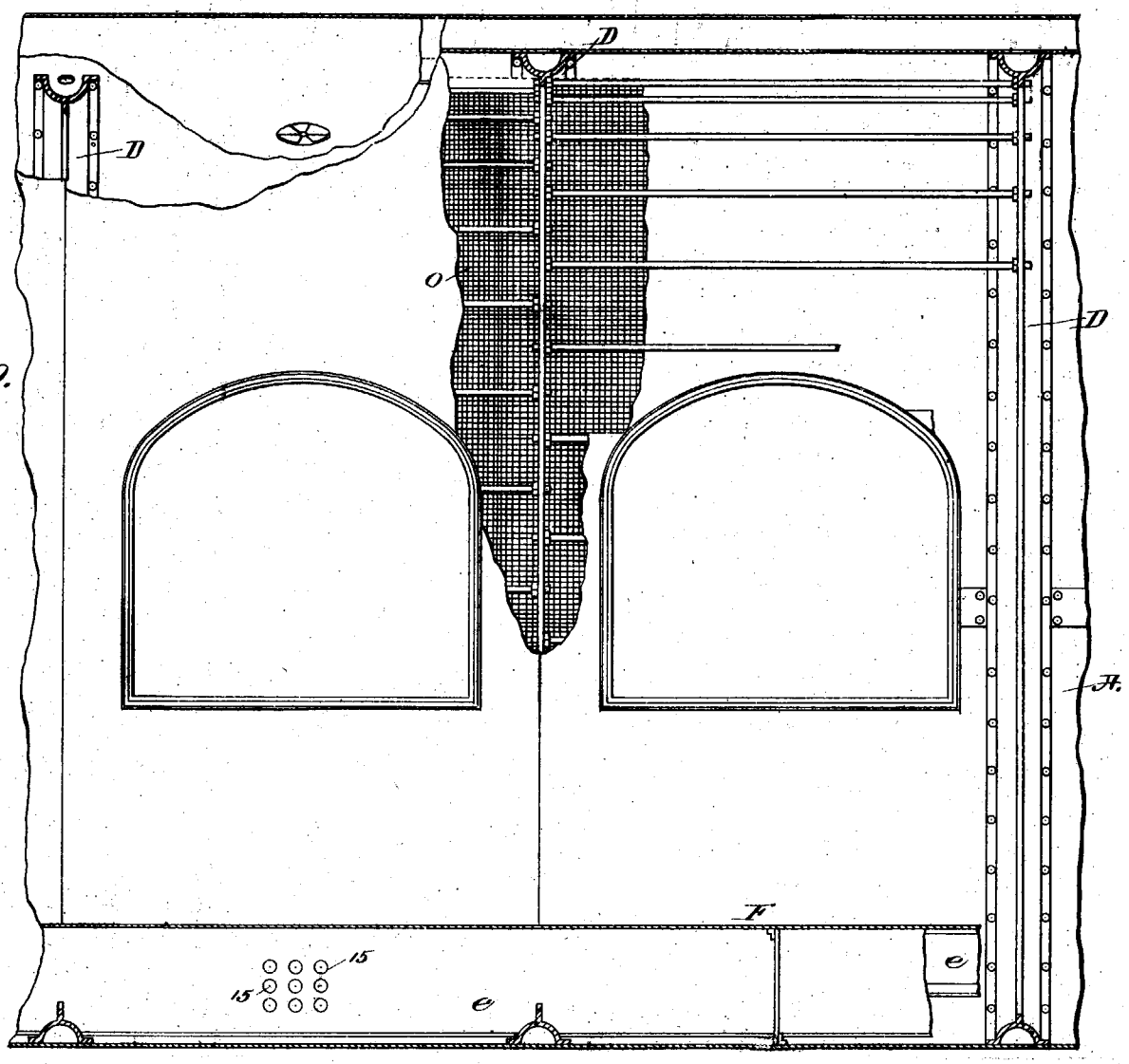

The keelsons $e$ $e'$ in practice have openings 15 at suitable intervals, as shown in Fig. 9, in number sufficient to enable a uniform circulation of air to be maintained in the spaces below the floor $a'$ and between it and the car-body.

These keelsons, made, as described, of steel and flanged, are of great strength, yet not very heavy. The said keelsons at suitable intervals are sustained against lateral flexure by cross-braces $d^4$, (see Fig. 5,) flanged at their ends, and which in practice will be riveted to the keelsons, the upper edges of the cross-braces also acting to support the floor $a'$.

If desired, the spaces between the cross-braces $d^4$ may be filled in with floor-beams, one of which is shown at $d^5$, made of angle, flat, or bar iron, suitably riveted to the keelsons and, if desired, to the body.

In a freight-car, where the floor is subjected to blows, &c., these floor-beams may and will necessarily be more numerous than in a passenger-car.

The central space, $d$, will receive in it the smoke-pipe $f$ and other pipes in connection with the furnace or furnaces for heating the car, the said pipes and furnaces being shown and claimed in another application, Serial No. 213,237, filed September 10, 1886, to which reference may be had.

The sides of the body of the car are provided at frequent intervals with openings for the reception of the window-frames, herein shaped like dormer-windows, and composed each of a metal casing, L, extended into an opening at the side of the car-body and riveted or bolted thereto, preferably as shown in Fig. 7, by a flanged strip, the top of the said frame extending farthest from the outer side of the car-body.

The top of the frame L is protected by a metal cap composed, as shown, of a plate, $L'$, and a front plate, $L^2$, riveted or otherwise attached together and to the car-body and frame L. Below the frame L, and about the opening therein, we may, if desired, add an ornamental sill and front beading, as at $L^3$ $L^4$.

The sash $g$, composed of metal and provided with a glass, $g'$, is set into the window-frame between front beading and a guide, $g^3$, the sash when raised entering the space $g^4$. The lower side of the car-body rests upon a bolster, M, concaved at its upper side to aid in holding the body in place against lateral strain, the under side of the bolster resting on bearings of the truck N, of any usual or suitable construction.

The car-body, at its outer side and near its lower part, is provided with two reservoirs, T T, of metal, made trough-shaped and bolted or riveted to the car-body, the joint between the parts being made gas-tight, the said reservoirs receiving gas from a suitable gasometer or other source of supply. (Not shown.)

If desired, gas-pipes $k$ may be placed in the said reservoirs to hold the gas, and in such event the junction of the reservoir and the car-body need not be gas-tight.

The reservoir, besides being useful for gas-storage, also possesses great utility as a longitudinal strengthening-brace for the car-body.

The floor F, of metal, is attached to the keelsons and other parts below it by suitable screws, $h^2$.

The car-body will or may be divided by partition-walls to constitute apartments such as now ordinarly found in cars.

In Fig. 2 the right-hand end of the car-body is shown as provided with two apartments or closets. The tubular body is terminated and closed by ends $A^6$, composed of one or more sheets or plates of metal cut out or provided with openings for the usual windows and door in the end of the car, and not herein shown, the casing for the windows and doors being of metal.

The ribbed braces D, made hollow to form air ducts or passages from the monitor-top to below the car-floor, and which strengthen the car on its inside, are provided with flanges 10, to which rods R are secured.

The rods R serve to secure in place a sheathing of reticulated metal, which rests upon a lining of felt or other material, and which forms a backing for the upholstery of the car, the said lining and upholstery being not herein shown and claimed, as they form the subject-matter of another application, Serial No. 215,543, filed October 7, 1886.

I claim—

1. A car-body composed of metal plates riveted together, and having its top, bottom, and sides of different curvatures, combined with keelsons extended longitudinally from end to end of the car-body, and the floor *a*, supported on the said keelsons, and cross-braces for the keelsons, substantially as described.

2. A car-body composed of metal plates riveted together, and having its top, bottom, and sides of different curvature and provided with window-spaces along its sides, combined with metallic dormer-window frames L, bolted or riveted to the metallic body, as set forth, and the cap L′ L² and sliding-sash, the latter, when lifted, entering the space *g*′ in the said cap, substantially as described.

3. The metallic car-body composed of metal plates riveted together, and having its top, bottom, and sides of different curvature, and the floor *a*, combined with two or more keelsons at each side of the longitudinal center of the car, the said keelsons being provided with openings for the circulation of air in the spaces below the floor and between it and the body and the keelsons, substantially as described.

4. The metallic car-body composed of plates or sheets riveted together, and having its top, bottom, and sides of different curvatures, and the floor *a*, combined with keelsons extended longitudinally through the car-body and beyond the ends to support the platform, substantially as described.

5. A car-body composed of metal plates riveted together, and having its top, bottom, and sides of different curvature, combined with keelsons *e e*′, extended longitudinally from end to end of the car-body, and the floor *a*, supported on said keelsons, substantially as described 6. A car-body composed of metal plates riveted together, and having its top, bottom, and sides of different curvature, and flanged braces D, secured to the inside of the car-body, combined with keelsons extended longitudinally from end to end of the car-body, and the floor *a*, supported on said keelsons, substantially as described.

7. The metallic car body having its top, bottom, and sides of different curvatures, and the braces D, provided with flanges 10, combined with the rods R, connecting the said braces, substantially as described.

8. A car-body composed of sheet metal riveted together to form a shell, the latter in cross-section being in arcs of circles of different radii, the arc comprising the top or roof part of the car-body being smaller than that of the sides of the car-body between the floor-line and window-sills, while the arc for the bottom of the car-body below the floor is of greater radius than the sides below the window-sills, substantially as described.

In testimony whereof I have signed my name to this specification in the presence of two subscribing witnesses.

CHARLES M. SMITH.

Witnesses:

JAS. H. CHURCHILL,

E. L. FRENCH.